(12) United States Patent
DeWitt, Jr. et al.

(10) Patent No.: US 7,474,991 B2
(45) Date of Patent: Jan. 6, 2009

(54) METHOD AND APPARATUS FOR ANALYZING IDLE STATES IN A DATA PROCESSING SYSTEM

(75) Inventors: Jimmie Earl DeWitt, Jr., Georgetown, TX (US); Jesse M. Gordon, Austin, TX (US); Frank Eliot Levine, Austin, TX (US); Kean G. Kuiper, Round Rock, TX (US); Enio Manuel Pineda, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 11/335,798

(22) Filed: Jan. 19, 2006

(65) Prior Publication Data

US 2007/0180102 A1 Aug. 2, 2007

(51) Int. Cl.
*G06F 11/30* (2006.01)
*G21C 17/00* (2006.01)
(52) U.S. Cl. ...................... 702/186; 702/182
(58) Field of Classification Search .......... 702/182–186
See application file for complete search history.

(56) References Cited

U.S. PATENT DOCUMENTS

| 5,691,920 | A | * | 11/1997 | Levine et al. ............... 702/186 |
| 6,049,798 | A | | 4/2000 | Bishop et al. |
| 6,193,422 | B1 | * | 2/2001 | Belt et al. .................... 713/320 |
| 6,434,714 | B1 | | 8/2002 | Lewis et al. |
| 6,587,432 | B1 | * | 7/2003 | Putzolu et al. .............. 370/229 |
| 7,233,991 | B2 | * | 6/2007 | Adhikari ..................... 709/224 |
| 2003/0114949 | A1 | | 6/2003 | Armstrong et al. |
| 2004/0024797 | A1 | * | 2/2004 | Berry et al. ................. 707/206 |
| 2004/0078691 | A1 | * | 4/2004 | Cirne et al. ................... 714/38 |
| 2005/0071611 | A1 | * | 3/2005 | DeWitt et al. ............... 712/227 |
| 2005/0155022 | A1 | * | 7/2005 | DeWitt et al. ............... 717/131 |
| 2005/0289307 | A1 | * | 12/2005 | Achanta et al. ............. 711/159 |
| 2007/0220515 | A1 | * | 9/2007 | Dewitt et al. ................ 718/100 |
| 2007/0277157 | A1 | * | 11/2007 | DeWitt et al. ............... 717/130 |
| 2008/0148240 | A1 | * | 6/2008 | Jones et al. ................. 717/130 |

FOREIGN PATENT DOCUMENTS

EP 679995 10/2000

OTHER PUBLICATIONS

Alexander et al., "A unifying approach to performance analysis in the Java Environment", IBM Systems Journal, vol. 39, No. 1, 2000, pp. 118-134.

* cited by examiner

*Primary Examiner*—Michael P Nghiem
(74) *Attorney, Agent, or Firm*—Duke W. Yee; Herman Rodriguez; Gerald H. Glanzman (57) ABSTRACT

A computer implemented method, apparatus, and computer usable program code to collect information for a system or processor having a transition between an idle state and a non-idle state. Idle counts occurring during execution of code are collected to form collected system or processor information. The collected system or processor information is provided to an application for analyzing why a processor becomes idle.

7 Claims, 5 Drawing Sheets

METHOD AND APPARATUS FOR ANALYZING IDLE STATES IN A DATA PROCESSING SYSTEM

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer usable program code for analyzing performance of a data processing system.

2. Description of the Related Art

In writing code, runtime analysis of the code is often performed as part of an optimization process. Runtime analysis is used to understand the behavior of components or modules within the code using data collected during the execution of the code. The analysis of the data collected may provide insight to various potential misbehaviors in the code. For example, an understanding of execution paths, code coverage, memory utilization, memory errors and memory leaks in native applications, performance bottlenecks, and threading problems are examples of aspects that may be identified through analyzing the code during execution.

The performance characteristics of code may be identified using a software performance analysis tool. The identification of the different characteristics may be based on a trace facility of a trace system. A trace tool may be used using various techniques to provide information, such as execution flows as well as other aspects of an executing program. A trace may contain data about the execution of code. For example, a trace may contain trace records about events generated during the execution of the code. A trace also may include information, such as, a process identifier, a thread identifier, and a program counter. Information in the trace may vary depending on the particular profile or analysis that is to be performed. A record is a unit of information relating to an event that is detected during the execution of the code.

One part of analyzing the performance of a system involves identifying the reasons that a processor is busy or idle. In a symmetric multi-processor system, an inability to adjust a workload to keep all of the processors busy limits the scalability of the system. Complex applications, such as Web servers and other E-Commerce applications require an understanding as to why these applications are not fully utilizing the available processor cycles.

Therefore, it would be advantageous to have a computer implemented method, apparatus, and computer usable program for generating data regarding processor utilization.

SUMMARY OF THE INVENTION

The present inventions provide a computer implemented method, apparatus, and computer usable program code to collect system or processor information for a system or processor having a transition between an idle state and a non-idle state. The collected system or processor information is provided for analysis by an application.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
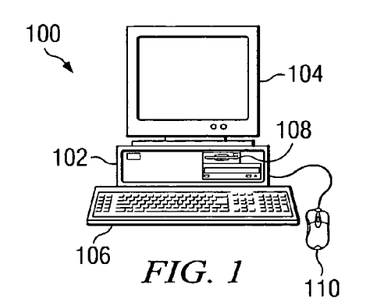
FIG. 1 is a pictorial representation of a data processing system in which the aspects of the present invention may be implemented.

With reference now to the figures and in particular with reference to FIG. 1, a pictorial representation of a data processing system in which the aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
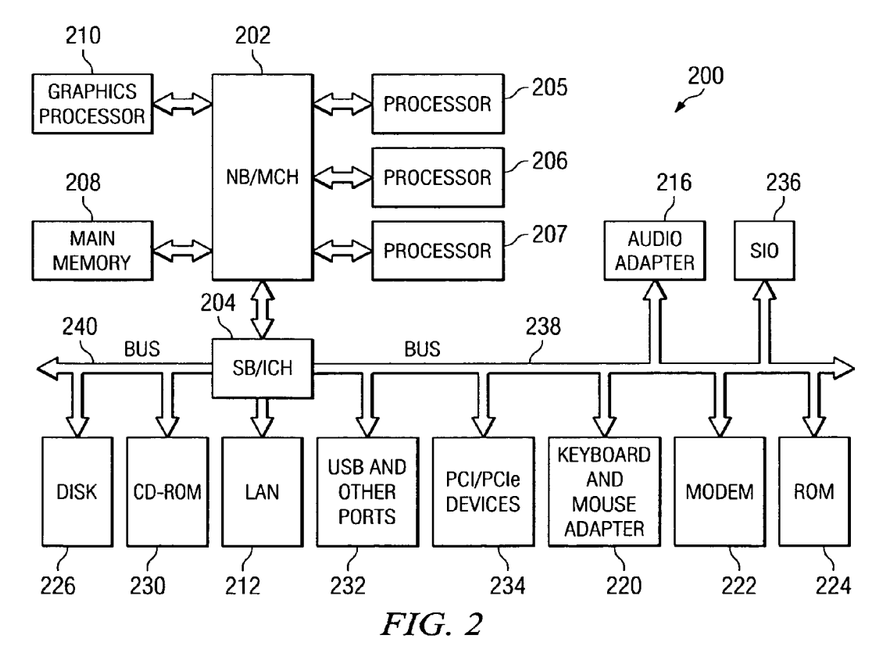
FIG. 2 is a block diagram of a data processing system in which aspects of the present invention may be implemented.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

Program code/instructions for the operating system, the object-oriented programming system, and applications or programs are located on storage devices, such as hard disk drive 226, and may be loaded into main memory 208 for execution by processor 206. The processes of the present invention are performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide a computer implemented method, apparatus, and computer usable program product for collecting data on idle states occurring during execution of code in a data processing system. In these examples, the aspects of the present invention analyze the transition and process states and collect idle counts during the execution of the code to form collected idle counts. This collecting of idle counts includes collecting information for a system having a transition between an idle state and a non-idle state. This system information may be information about a thread. The aspects of the present invention identify on a per-processor and per-thread basis the number of idle states intervals occurring for individual processors and all processors.

Additionally, the per-thread information identifies a number of dispatches from running to idle state and from idle state to running. Additionally, the total number of dispatches for the current processor and total number of idle dispatches for all processors are identified. The aspects of the present invention allow for the association of idle information with entry/exit trees used to track execution of threads. On any entry or exit event, idle information may be applied to a node in these examples. Additionally, when nodes in a tree are constructed, a unique node address is added for each node to allow correlation of the context with the trace records. Alternatively, any unique node identifier may be used to provide a correlation between nodes and trace records. This unique node address is also written to a shared thread work area as entries and exits are processed. This node address may also be written into a trace record by a device driver. In this manner, reports may be generated for various idle related events.

Figure 3:
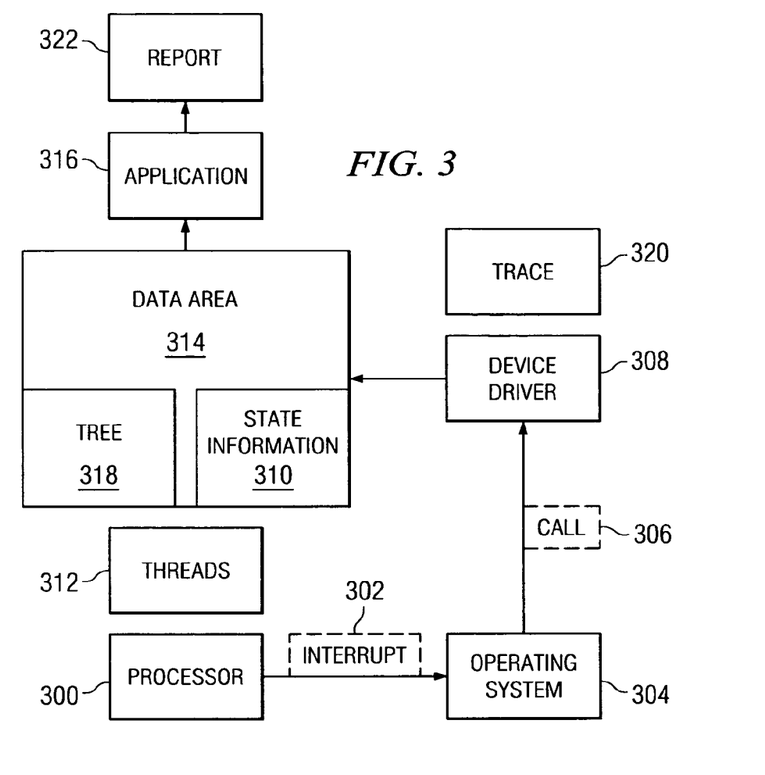
FIG. 3 is a diagram illustrating components used to identify idle states during processor utilization in accordance with an illustrative embodiment of the present invention.

Turning now to FIG. 3, a diagram illustrating components used to identify idle states during processing is depicted in accordance with an illustrative embodiment of the present invention. In this depicted example, the components are examples of hardware and software components found in a data processing system, such as data processing system 200 in FIG. 2.

Processor 300 generates interrupt 302 and operating system 304 generates call 306. Call 306 is identified and processed by device driver 308. In these examples, the call is generated by a presently used operating system dispatcher located in operating system 304. This dispatcher is hooked or modified to generate a call or a branch to device driver 308 when an event of interest occurs. When call 306 is received from operating system 304, device driver 308 determines whether the dispatch is directed towards an idle processor thread or to a processor thread that is not idle in threads 312. Device driver 308 updates state information for processor 300, performs operations such as accumulating counts and writing trace records 320. Device driver 308 saves state information 310 in data area 314 and returns control back to the dispatch routine within operating system 304.

Device driver 308 receives call 306 through hooks in these examples. A hook is a break point or callout that is used to call or transfer control to a routine or function for additional processing, such as determining idleness occurring during execution in these examples.

In these illustrative examples, device driver 308 increments counters for processors in which idle states occur to indicate the number of times a processor is idle during execution in state information 310. Device driver 308 writes counts or state information 310, which is accessible by application 316. Device driver 308 writes or increments a counter each time the idle thread is dispatched (at either the entry from the dispatch to the idle thread or the exit from the idle thread to the dispatch) and copies or accumulates this information for a thread into an area 310 accessible by the thread. At each entry or exit, application 316 records the current count for the number of idle states and compares this to a last count for the number of idle states for a particular thread. The difference between the two counts is accumulated into the current node in tree 318.

In these illustrative examples, the state information includes a count of the number of times that the operating system has dispatched to or from the idle thread. The counts are made on a per-processor basis. Additionally, an overall count for all the processors also may be maintained. These counts are maintained by device driver 308 in these examples. This information may be collected by application 316 to generate report 322 regarding idle states of processor 300. Application 316 may access data area 314 to process information and record information in tree 318.

Application 316 is an application that is event based, for example, the application receives a call out on any entry or exit to a routine. For Java, it may use the Java Virtual Machine Profiling Interface (JVMPI) requesting entry/exit notification. For C programs, it may request hooking by the compiler at function entry and exits. In this application any reference to method may also be applicable to a function. Tree 318 is constructed as entries and exits are processed. The aspects of the present invention store the number of idle states that have occurred in nodes within tree 318.

A count of the number of times that the thread for a processor has gone into an idle state is accumulated in a current node. The current node is the node for the method that has been entered into in executing the thread. When a method is entered, the current idle count is identified. When the method is exited or another method is entered, the new idle count is identified. The difference between the base of current idle counts and the new idle count is accumulated into the current node in tree 318. When the node is created, a unique identifier is also placed in the node. When entries or exits are processed, the node identifier for the current node being processed may be written by the application to a shared work area that is also accessible by a device driver. This unique identifier may be associated with, or used to identify this node for correlation with other state information in these illustrative examples.

In an alternative embodiment, each time a dispatch occurs in which a thread with a unique identifier is dispatched with a change from its idle count, device driver 308 also generates a trace record for placement into trace 320. This particular trace record contains an identification of the current node address at the time of the interrupt. This node address is the unique identifier in these examples. This current node address is placed into trace 320 along with idle counts.

As a result, application 316 may access nodes within tree 318 and trace 320 to generate report 322. The combination of the information from trace 320 and tree 318 provide idle information needed to analyze and determine why processors become idle during execution of code. In these illustrative examples, report 322 contains information as to when processors are idle with respect to execution of threads 312.

In this illustrative example, only a single processor is illustrated. The aspects of the present invention may be applied to multi-processor systems in which two or more processors are present. In these types of systems, a counter may be assigned to each processor as well as a counter for the overall number of times that idle states have occurred in all of the processors within the data processing system.

Figure 4:
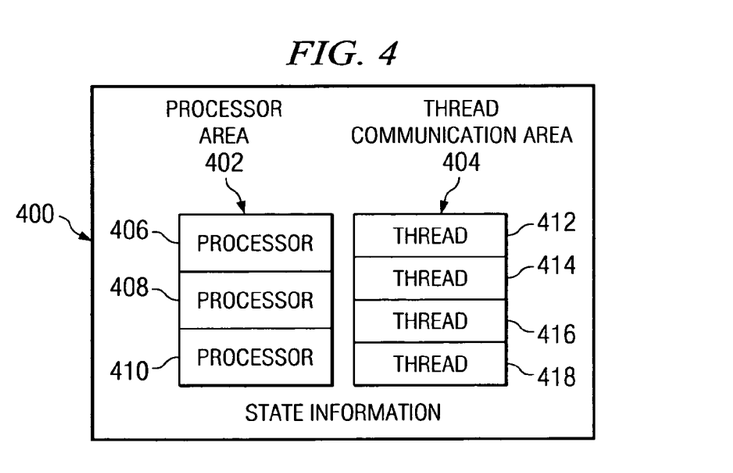
FIG. 4 is a diagram illustrating state information in accordance with an illustrative embodiment of the present invention.

Turning to FIG. 4, a diagram illustrating state information is depicted in accordance with an illustrative embodiment of the present invention. In this example, state information 400 is an example of state information 310 in FIG. 3. State information 400 contains processor area 402 and thread communication area 404.

In this example, process area 402 contains the number of idle dispatches for each processor. As depicted, process area 402 contains idle dispatch information for processors 406, 408, and 410. Thread communication area 404 contains information for individual threads. The information in thread communication area 404 may be accessed by the application and by the device driver. This area could be, for example, shared memory or specific requests to read or write to the area. In this example, thread communication area 404 contains state information for threads 412, 414, 416, and 418. Each of these sections in thread communication area 404 contains information that may include any or all of the following: an identification of the processor last dispatched, the number of idle dispatches on that processor at the time that the thread was last dispatched, the total number of idle dispatches on all processors at the time the thread was dispatched, the total number of dispatches while on any specific processor and an identification of the node, pNode. This identification may be the address of the node or any other unique identifier with the application's context. pNode may be written by the application as it processes entries and exits.

A call tree is constructed to identify all the functions or methods being called by any function or method. Each node in the call tree uniquely identifies a thread's call stack. For example in FIG. 5, the node C 506 identifies the call stack A->B->C The call tree is constructed by monitoring method/functions entries and exits. This can be done in several different ways, in "C" programs most modern compilers provide a "function begin" and "function end" label that can be utilized by an application program. This feature is usually provided by the compiler as a compiler option flag. In dynamic programs, such as Java, the architecture usually provides the ability to "hook" into code execution Java virtual machine profiler interface (JVMPI) or its replacement the Java virtual machine tools interface (JVMTI), sending an event on method entry and exit to monitor code. Using either of these methods, as well as others, it is possible to create the program's call tree as code execution is processed. For more information about constructing call trees and applying base time or metric such as idle counts, refer to IBM Systems Journal, Vol. 39, Nov. 1, 2000, pgs. 118-134, "A unifying approach to performance analysis in the Java environment."

This call tree can be stored in trace records 320 in FIG. 3, or as a separate file that can be merged in by application 316 in FIG. 3. Application 316 in FIG. 3 can use this call tree to provide the application's path as it goes into an idle state.

Figure 5:
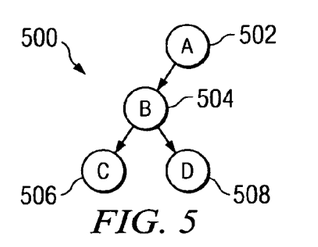
FIG. 5 is a diagram illustrating a tree in accordance with an illustrative embodiment of the present invention.

Turning to FIG. 5, a diagram of a tree is depicted in accordance with an illustrative embodiment of the present invention. Tree 500 is an example of tree 318 in FIG. 3. Tree 500 is accessed and modified by an application, such as application 316 in FIG. 3. In this example, tree 500 contains nodes 502, 504, 506, and 508. Node 502 represents an entry into method A, node 504 represents an entry into method B, and nodes 506 and 508 represent entries into method C and D respectively. These nodes are created during entries and exits into various methods by threads. In the illustrative examples, each of these nodes is associated with a unique node identifier, which is then written into a trace, such as trace 320 in FIG. 3. The unique node identifier in these examples is the address of the node in memory. The information in these nodes also allow for retrieval of call stack information. The tree's node identifies the path to the node. For example, node 508 is labeled "D". This node's call stack is A–>B–>D Turning now to FIG. 6, a diagram illustrating information in a node is depicted in accordance with an illustrative embodiment of the present invention. Entry 600 is an example of information in a node, such as node 502 in FIG. 5. In this example, entry 600 contains method/function identifier 602, tree level (LV) 604, calls 606, callees (CEE) 608, base 610, maximum amount of BASE time for any one event (M0MAX) 612, allocated objects (AO) 614, allocated bytes (AB) 616, Dispatches to idle (DIP) 618,Idle counts for all processors 624, and node identifier (pNode) 622.

Figure 6:
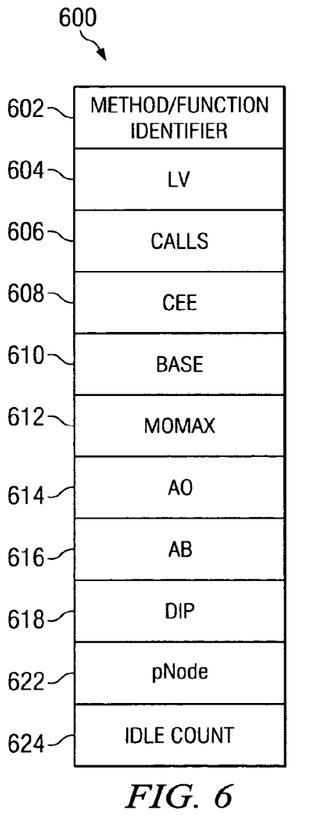
FIG. 6 is a diagram illustrating information in a node in accordance with an illustrative embodiment of the present invention.

Entry 600 also contains (stores) idle counts for all processors 624 and idle counts on a processor 618. The information within entry 600 is information that may be generated for a node within a tree. For example, method/function identifier 602 contains the name of the method or function. Tree level (LV) 604 identifies the tree level of the particular node within the tree. For example, with reference back to FIG. 5, if entry 600 is for node 502 in FIG. 5, tree level 604 would indicate that this node is a root node.

Calls 606 indicates the number of calls made to the particular method. Base 610 identifies the accumulated time on the method. The accumulated time is often stored in terms of numbers of instructions or cycles. Maximum time (M0MAX) for any one event 612 identifies the maximum time that occurs for a particular event. Allocated objects (AO) 614 identifies the number of objects allocated to the method and allocated bytes (AB) 616 identifies the number of bytes allocated by the method. A unique identifier for the node, in this case the address or pointer to the node pNode 622 may be written in the Node at the time the node is created. In addition, pNode 622 may be provided to the device driver in a preferred embodiment by writing the currently active pNode at entries and exits to a data area shared between the device driver and the application.

In addition, the aspects of the present invention include other information used to determine why a particular processor is idle during certain periods of time when executing code. For example, node identifier 622 is employed such that trace records may be merged with information in the different nodes of a tree. This node identifier is an address of the node within memory in these examples. Idle count 624 identifies the total number of times that any processor was idle while the method was executing. Dispatches to idle (DIP) 618 consists of the number of dispatches to idle on the same processor as the method was last running. Other counts and approaches could be used, for example, count only dispatches from the thread to idle, or count only dispatches from idle to the thread.

Figure 7:
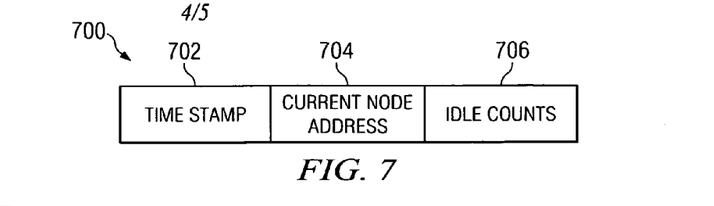
FIG. 7 is a diagram illustrating a trace record in accordance with an illustrative embodiment of the present invention.

Turning to FIG. 7, a diagram illustrating a trace record is depicted in accordance with an illustrative embodiment of the present invention. In this example, trace record 700 is an example of a trace record within trace 320 in FIG. 3. Trace record 700 contains time stamp 702, current node address 704, and idle counts 706. Trace record 700 is generated when there is a dispatch to or a dispatch from a thread that contains a pNode and there is also a change of idle counts from those in the thread work area and those maintained by the device driver. This record may be correlated to a call tree, such as tree 500 in FIG. 5. The correlation of this information with information within a tree showing entries into and exits from methods provides an ability to recover both the thread and the complete call stacks with the address of the current tree node found in current tree node address 704.

Time stamp 702 indicated when the particular event occurred. Additionally, idle counts 706 indicates changes or count relating to dispatches to or from idle for the processor on which the thread had last been dispatched or the total number of idle counts for all processors or the number of dispatches to idle from the thread or the number of dispatches from idle to the thread. The information may be compressed by providing indications of what has changed and including only the change information. Current tree node address 704 corresponds to the information stored in node identifier 622 in FIG. 6.

Figure 8:
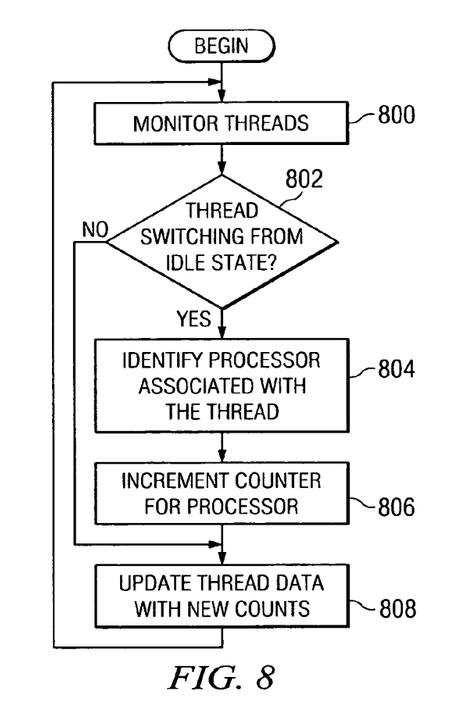
FIG. 8 is a flowchart of a processor for incrementing counters for threads in an idle state in accordance with an illustrative embodiment of the present invention.

Turning to FIG. 8, a flowchart of a processor for incrementing counters for threads in an idle state is depicted in accordance with an illustrative embodiment of the present invention. The process illustrated in FIG. 8 may be implemented in a device driver, such as device driver 308 in FIG. 3.

The process begins by monitoring threads (step 800). A determination is made as to whether a thread is switching from an idle state (step 802). This determination may be made by a device driver in response to dispatches occurring during execution of code by a processor. Next, the processor associated with the thread is identified (step 804). The process then increments the counter for the identified processor (step 806). The process then proceeds to update the thread data area with idle counts (step 808). These idle counts may include the specific processor idle counts or idle counts for all processors or any other idle count as described in this application. Then, the process proceeds to step 800 as described above. Step 808 is described in more detail in the description of FIG. 11 below.

With reference again to step 802, if the thread is not switching from an idle state the process proceeds to step 808 as described above.

Figure 9:
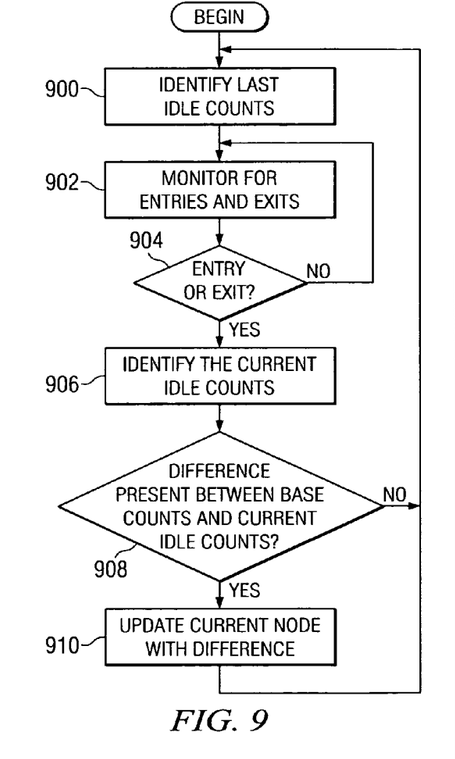
FIG. 9 is a flowchart of a process for monitoring an active thread in accordance with an illustrative embodiment of the present invention.

Turning now to FIG. 9, a flowchart of a process for monitoring an active thread is depicted in accordance with an illustrative embodiment of the present invention. The process illustrated in FIG. 9 may be implemented in an application, such as application 316 in FIG. 3. The application monitors a thread that is active using this process to update counts in a node when a thread enters or exits a method.

The process begins by identifying last idle counts (step 900) which could be kept in its thread node. Thereafter, the process monitors the thread for entries and exits into methods (step 902). A determination is made as to whether an entry or exit has been detected (step 904). If an entry or exit into a method is not detected, the process returns to step 902 to continue to monitor the thread.

Otherwise, the process identifies the current idle count (step 906). The current idle counts are identified from counters present in a work area, such as data area 314 in FIG. 3. These counts may be any of the counts being maintained in the thread work area by the device driver, for example it could be the dispatch to idle count for a particular processor on which the thread had been executing or it could be the counts of all dispatches to idle for all processors. A determination is made as to whether a difference is present between the base count and the current idle count (step 908). If a difference is present, the process updates the current node with the difference between the two counts (step 910) with the process then returning to step 900. With reference again to step 908, if a difference is not present, the process also returns to step 900 without updating any of the nodes or it could add the difference of zero.

Figure 10:
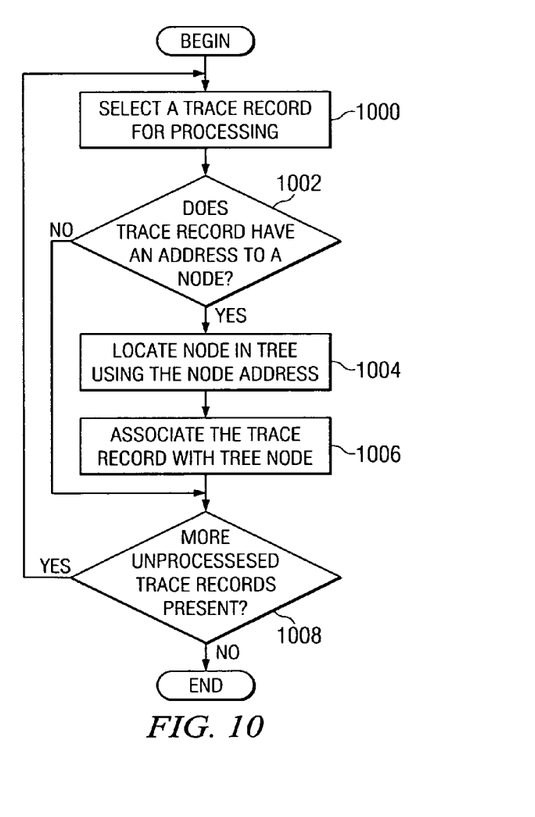
FIG. 10 is a flowchart of a process for combining trace records with nodes in a tree in accordance with an illustrative embodiment of the present invention.

Turning now to FIG. 10, a flowchart of a process for combining trace records with nodes in a tree is depicted in accordance with an illustrative embodiment of the present invention. The process illustrated in FIG. 10 may be implemented in an application, such as application 316 in FIG. 3. This process is used to combine trace records with trees. The correlating or associating of information in a tree may involve, for example, writing the information into the node or creating a new node depending on the particular implementation. The combining of trace records as described in FIG. 10 may occur on different data processing systems. For example, the data may be captured from an embedded device or remote data processing system. This information may be collected and combined at another data processing system for analysis.

The process begins by selecting a trace record for processing (step 1000). A determination is made as to whether the trace record has an address to a node (step 1002). If the trace record has an address to a node, the node is located in the tree using the node address (step 1004). The process then associates the trace record with the tree node (step 1006). Step 1006 may be implemented by placing the information from the trace record into the tree node. Alternatively, a new node may be created. Thereafter, a determination is made as to whether additional unprocessed trace records are present (step 1008). If additional unprocessed trace records are present, the process returns to step 1000. Otherwise, the process terminates.

With reference again to step 1002, if the trace record does not have an address to a node, the process proceeds to step 1008 as described above. In this manner, information may be combined from trace records identifying idle counts with a tree constructed by processing entries and exits. By correlating the idle count or event information with this tree, an analysis may be made as to why a processor is idle during certain points of execution.

Figure 11:
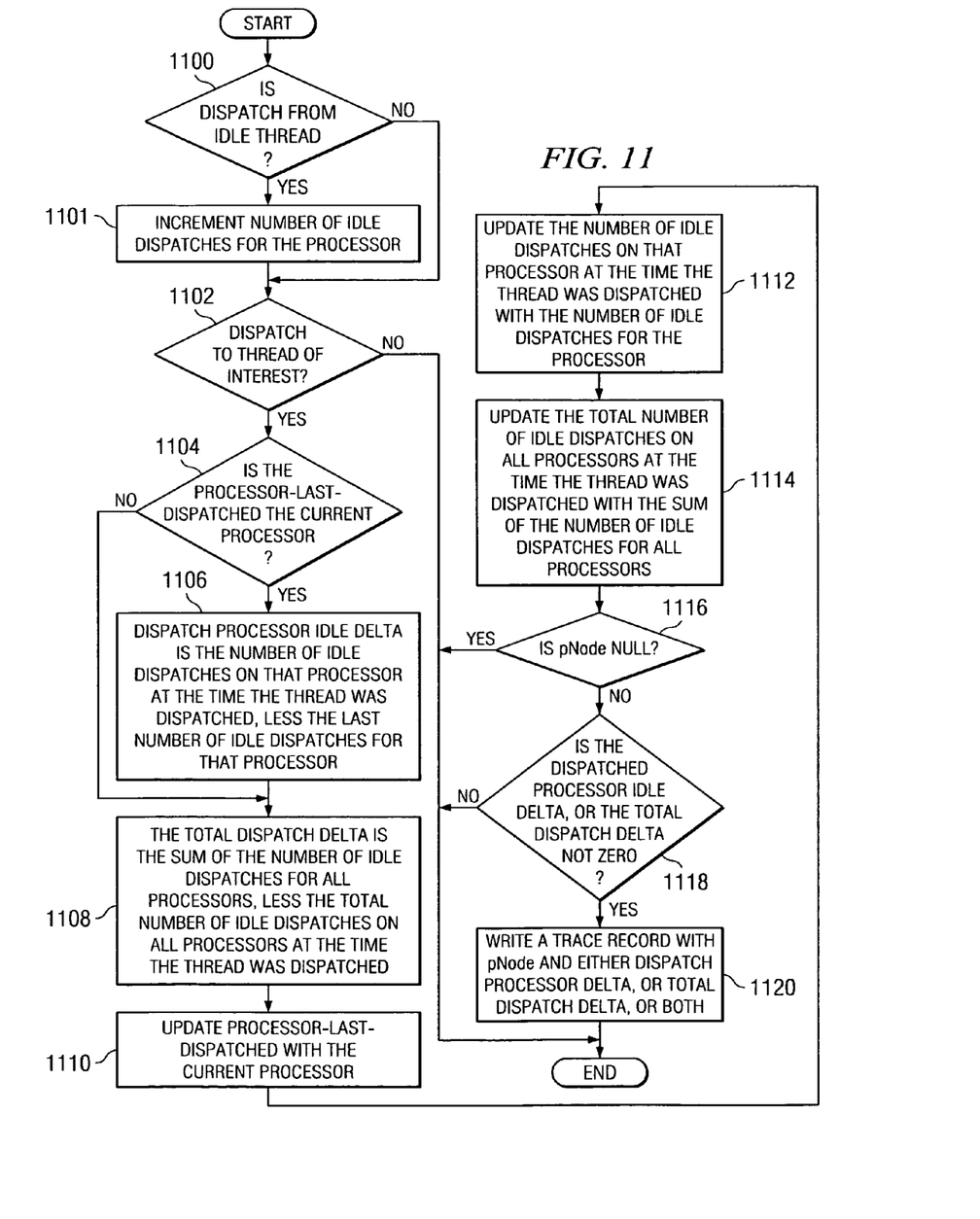
FIG. 11 is a flowchart of a process for handling dispatching from an idle thread in accordance with an illustrative embodiment of the present invention.

With reference now to FIG. 11, a flowchart of a process for handling dispatching from an idle thread is depicted in accordance with an illustrative embodiment of the present invention. The process illustrated in FIG. 11 may be implemented in a device driver, such as device driver 308 in FIG. 3. In particular, FIG. 11 is a more detailed description of step 808 in FIG. 8. This figure describes a single dispatch in these examples.

The process begins when a thread is dispatched and a determination is made if the dispatch is from idle (step 1100) If the dispatch is from idle then the process continues by incrementing the number of idle dispatches for the processor (step 1101). In any case the process continues by making a determination as to whether the dispatch is to a thread of interest (step 1102). The thread of interest may be any thread or a particular thread that has been identified for monitoring. If the dispatch is not to a thread of interest, the process terminates by returning to monitoring threads (step 800). Otherwise, a determination is made as to whether the thread of interest was last dispatched to the current processor (step 1104).

If the thread of interest was last dispatched to the current processor, the dispatch processor's idle delta is set equal to the new number of idle dispatches on that processor at the time the thread was dispatched minus the last number of idle dispatches for the processor (step 1106). The last processor dispatched and the last number of idle dispatches for the processor are available in the thread work area. The new number of idle dispatches on that processor are in the per processor work area. The change of values are placed or accumulated in the thread work area. If the last processor dispatched is not the current processor as specified in the thread work area, then in a preferred embodiment, the difference between the current value of the number of idle dispatches on the previous processor available in the per processor work area and the previous number of idle dispatches on the thread available in the thread work area may be added to the total number of dispatches on processor in the thread work area. In this embodiment, the total number of dispatches on the last dispatched processor is also kept in the thread work area. Then or later, the thread work area is updated with the new processor and the new number of dispatches for that processor in the thread work area (step 1112). Thereafter, the total dispatch delta is set equal to the sum of the number of idle dispatches for all processors minus the total number of idle dispatches on all processors at the time thread was dispatched (step 1108). In alternative embodiment, the process proceeds directly to this step from step 1104, if the processor last dispatched is not the current processor. Next, the process updates the processor last dispatched in the thread work area with the current processor (step 1110).

Then, the number of idle dispatches on the processor at the time the thread was dispatched is updated with the number of idle dispatches for the processor (step 1112). Next, the process updates the total number of idle dispatches on all processors at the time the thread was dispatched with the sum of the number of idle dispatches for all processors (step 1114). A determination is made as to whether the pNode is null (step 1116). The pNode is the address for a node on a tree used to trace entries into and exits from methods. This determination is made to see whether a node is present. If the pNode is null, the process terminates. Otherwise, a determination is made as to whether the dispatched idle delta or the total dispatched delta is not equal to zero (step 1118). If both are equal to zero, the process terminates. Otherwise, a trace record is written with the pNode and either the dispatch processor delta, total dispatch delta, or both values (step 1120) with the process terminating thereafter.

Thus, the aspects of the present invention provide a computer implemented method, apparatus, and computer usable program product for generating data for use in determining why a processor may be idle during execution of code. The aspects of the present invention allow for the occurrence of idle states in a processor to be correlated to other execution information, such as methods being entered or exited and call stack information. With this combined information, reports may be generated to analyze why a processor enters an idle state during execution and whether those idle states may be reduced by code optimization or changes.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-useable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for analyzing transitions in processor states, the computer implemented method comprising:
   collecting idle counts occurring during execution of code to form collected idle counts; and
   providing the idle counts to an application for analyzing why a processor becomes idle, wherein collecting idle counts comprises:
      collecting information for a system having a transition between an idle state and a non-idle state to form collected system information; and
      providing the collected system information for analysis by an application; and wherein collecting information comprises:
         generating trace records in response to events in which the processor transitions to the idle state and from the idle state; and
         storing counts of times a processor associated with a thread has been in an idle state in nodes in a tree of entries into and exits out of routines.

2. The computer implemented method of claim 1, wherein the storing step comprises:
   storing a first count of a number of times a processor has been idle in a current node in response to an entry into a second routine from a first routine; and
   storing a second count of the number of times the processor has been idle in the current node in response to an exit from the first routine.

3. The computer implemented method of claim 2, wherein the first count is a difference between a base count of the number of times the processor has been idle when the first routine was entered and a current count of the number of times the processor has been idle when the entry into the second routine from the first routine occurs.

4. The computer implemented method of claim 2, wherein the second count is a difference between a base count of the number of times the processor has been idle when the first routine was entered and a current count of the number of times the processor has been idle when the exit from the first routine occurs.

5. The computer implemented method of claim 4 further comprising:
   combining the trace records with the nodes in the tree using node identifiers.

6. The computer implemented method of claim 2, wherein the second count is a difference between a base count of the number of times the system has been idle when the first routine was entered and a current count of the number of times the system has been idle when the exit from the first routine occurs.

7. The computer implemented method of claim 1, wherein each trace record in the trace records includes a node identifier of a current node present when each trace record was generated.

* * * * *